BEST AVAILABLE COPY

July 11, 1939. R. C. HOPKINS Des. Re. 21,146

HOSIERY DISPENSING MACHINE

Original Filed April 7, 1938

INVENTOR
ROBERT CHARLES HOPKINS
BY
R. B. Spencer Jones
ATTORNEY

BEST AVAILABLE COPY

Reissued July 11, 1939

Des. Re. 21,146

UNITED STATES PATENT OFFICE 21,146

DESIGN FOR A HOSIERY DISPENSING MACHINE

Robert Charles Hopkins, Rockville Centre, N. Y.

Original No. 111,107, dated August 30, 1938, Serial No. 76,341, April 7, 1938, for 3½ years. Application for reissue May 3, 1939, Serial No. 84,805. Term of patent 14 years

*To all whom it may concern:*

Be it known that I, Robert Charles Hopkins, a citizen of the United States and a resident of Rockville Centre, in the county of Nassau, Long Island, and State of New York, have invented a new, original, and ornamental Design for a Hosiery Dispensing Machine, of which the following is a specification, reference being had to the accompanying drawing, forming a part thereof.

Figure 2:
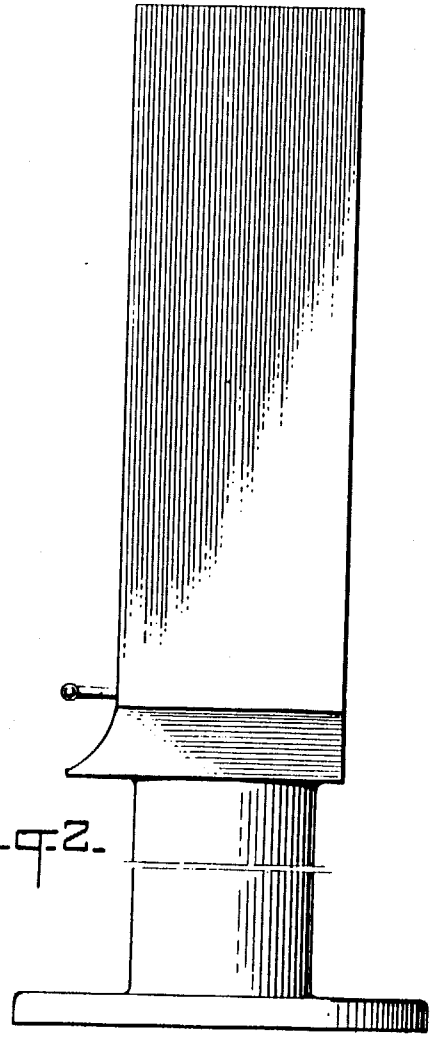
Figure 1:
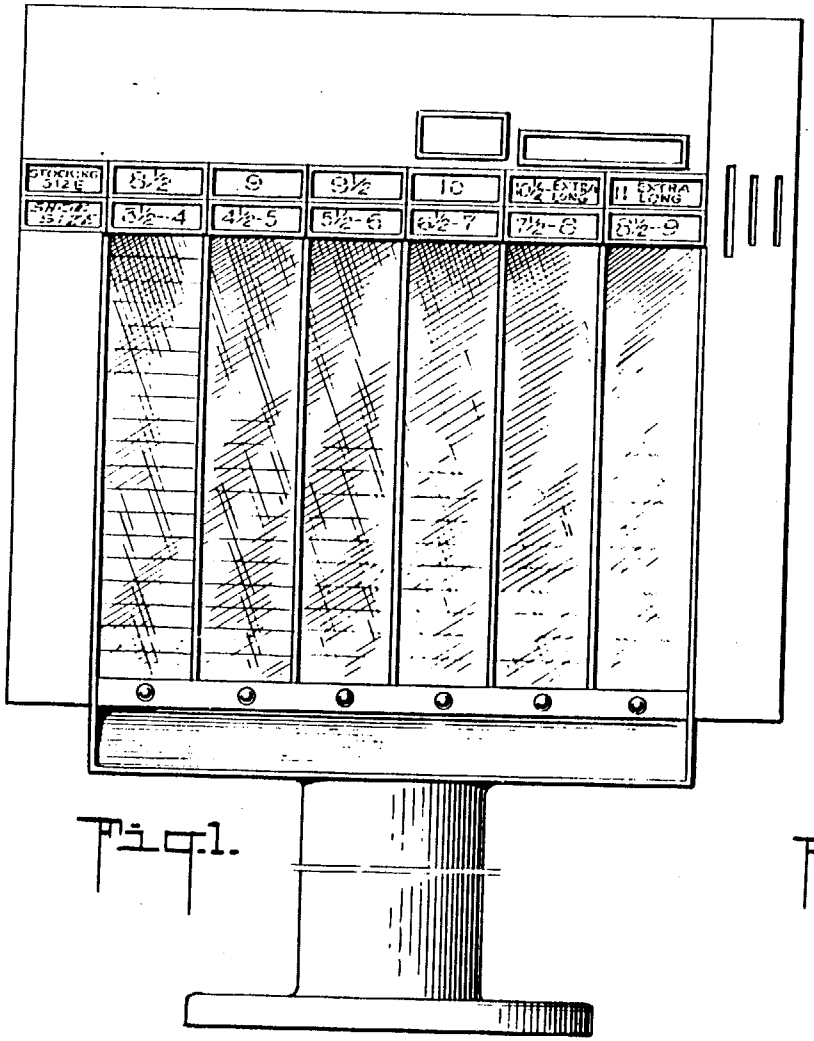

Figure 1 is a front elevation of the hosiery dispensing machine showing my new design, and Figure 2 is a side view of the same.

I claim:

The ornamental design for a hosiery dispensing machine, as shown.

ROBERT CHARLES HOPKINS.